May 15, 1945.  A. BÜCHI  2,376,115
CONTROL DEVICES FOR SCAVENGED IGNITION-TYPE
INTERNAL-COMBUSTION ENGINES
Filed Aug. 17, 1943
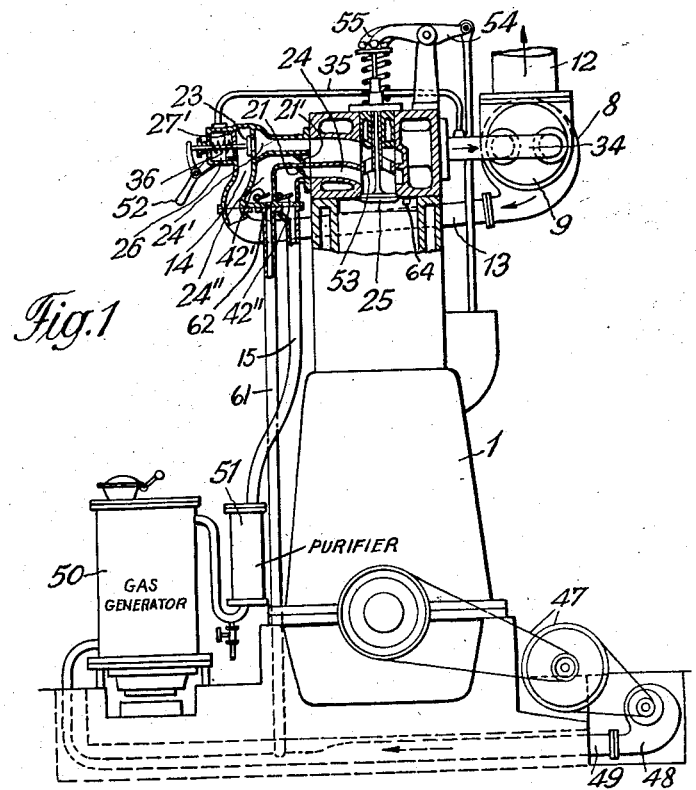
Fig.1
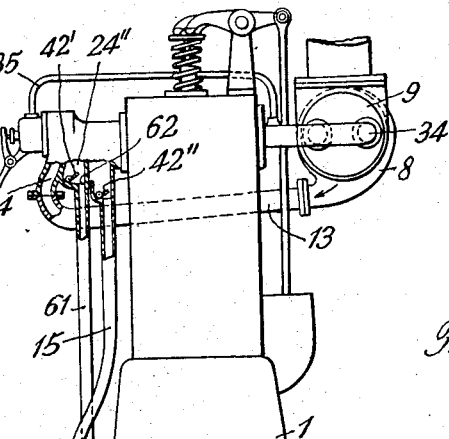
Fig.2
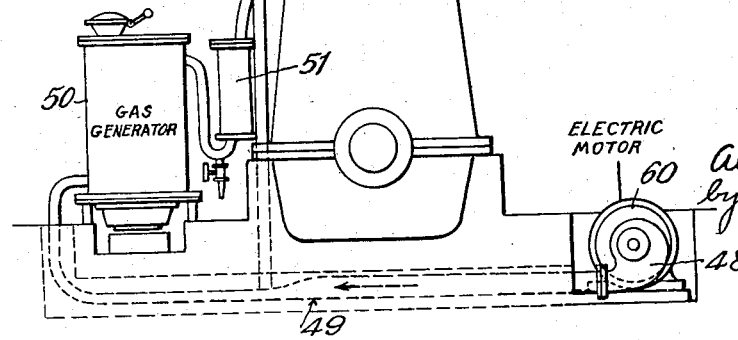
Inventor:
Alfred Büchi
by Sommers·Young
Attorneys Patented May 15, 1945

2,376,115

UNITED STATES PATENT OFFICE 2,376,115

CONTROL DEVICE FOR SCAVENGED IGNITION-TYPE INTERNAL-COMBUSTION ENGINES

Alfred Büchi, Winterthur, Switzerland

Application August 17, 1943, Serial No. 498,962
In Switzerland September 1, 1939

3 Claims. (Cl. 60—13).

The present invention relates to scavenged ignition-type internal combustion engines, operating in general according to the system disclosed in my Patent No. 2,325,032, dated July 27, 1943, and according to which the controlling of the timing of the scavenging air is effected by separate scavenging air admission control members which are separated from the charging air or mixture inlet control members and which are arranged together with said charging or mixture inlet control members in advance of the ordinary inlet members or valves mounted in the cylinders of the internal combustion engine, said scavenging air admission control members being operated by action of the pressure existing at any desired point in the engine cylinders or in the exhaust gas conduit leading out from the exhaust members mounted in these cylinders.

This implies that the actual air- or mixture-charge is supplied to the inlet members mounted in the cylinders of the internal combustion engine by means that are independent of the separate scavenging air means.

According to another feature of said invention automatically operating valves, for example flap or diaphragm controlled valves, are used for the charging air or mixture inlet and scavenging air admission control members, instead of mechanically operated control gear means, and the air may be supplied to the engine by exhaust gas turbine driven blower means alone or in conjunction with a blower which is mechanically driven by the internal combustion engine.

The present invention is especially concerned with the supplying of air to the engine.

According to this invention, with internal combustion engines operating by means of exhaust gas driven charging blowers the arrangement is such that one or more exhaust gas turbine driven blowers are provided for supplying the scavenging air, exclusively, the fuel and the charging air are then supplied together or both individually by at least one separate blower, pump or the like.

Two embodiments of the present invention in its application to an internal combustion engine in the form of a gas engine are illustrated in the accompanying drawing, by way of example only, in which Fig. 1 shows an end elevation of a gas engine representing a first embodiment of this invention, partly in section, and Fig. 2 shows a modified gas engine representing a second embodiment of this invention in a view similar to that illustrated in Fig. 1.

Referring to the drawing, the engine 1 receives the scavenging air through an exhaust gas turbine driven blower 8, 9, the turbine 9 of which receives the exhaust gases from the engine cylinder through a conduit 34 and discharges the spent gases through a conduit 12. The scavenging air precompressed by the blower 8 is supplied to the scavenging air intake passage 14 of the engine through a conduit 13.

Each cylinder of the combustion engine, that may be provided six in number, has a scavenging air inlet member 23 for shutting the admission passage 24' leading to the inlet valve 25. The passage 24' communicates with the intake passage 14 via the inlet member 23. This member is arranged to be opened when the pressure in a space 26, bordering a plunger 27' on the side remote from the member 23, is lower than in the space 14. For realising this a plunger 27' is arranged between these two spaces and is connected with the member 23, in such manner, that the latter opens automatically when the pressure in the space 26 is lower than that in the space 14.

In order to provide the pressure of the exhaust gases to be effective behind the engine 1 the space 26 is connected with the exhaust gas conduit 34 through a pipe 35. Plunger 27' is loaded by a spring 36, a lever 52 being provided whereby the scavenging air valve 23 can be opened or maintained closed from without. The inlet valve 25, which is actuated from the engine cam shaft through a rocker arm 54, may, for example, cooperate with a sleeve valve 53 being actuated by a rocker arm 55 also from the cam shaft of the engine, as is generally known in gas engine practice, and by means of which the gas or air supply can be additionally controlled.

Inwardly from the upwardly extending end portion of the space 14 a passage 24" is arranged which is shut against the space 14 (Figs. 1 and 2) by a ported closure wall through the port 62 of which charging air is supplied from a separate blower 48, which is mechanically driven from the engine by means of a belt drive 47, via a supply conduit 49 of the latter and a conduit 61 branching upwardly from the conduit 49. The part of the compressed air output of the blower 48 entering the passage 24" via a back pressure flap valve 42' passes toward the inlet valve 25 through a throttling member 21'. The other part of the compressed air output of the blower 48 passes into a gas generator 50. From the generator 50 the gas produced passes through a purifier 51, which can be of any suitable type, and through a conduit 15 into the passage 24 toward the inlet valve 25. Adjacent to the inlet valve 25 a throttle valve 21 is included in the admission passage 24 and a back pressure flap valve 42" adjacent to the port 62. By accordingly adjusting the throttling members 21 and 21' the supply of gas and air to the valve 25 can be regulated in regard to pressure and/or production of gas-air mixture by means of altogether pure air supplied by the independent blower 48, which due to being mechanically coupled to the engine 1 is thus adapted to reliably furnish the necessary amount of air at all engine loads and speeds, free from scavenging air. This entirely reliable functioning is not obviously obtained from exhaust gas turbine driven blower means, as herein used for supplying the scavenging air, under all conditions arising in actual practice since, as is well known, this kind of blower may fail to respond to large demand on air output such as may arise, when abrupt changes of engine loads and/or speeds occur.

The device for igniting the mixture charge in any suitable manner is designated by 64.

The operation of the gas engine described is as follows:

At the end of the exhaust stroke the scavenging operation begins, if initiated by the exhaust gas pressure existing in the conduit 35 and thus in the space 26, and endures as long as said pressure is effective in this respect. The valves 21 and 21' are open in normal operation, and on the termination of the scavenging the two flap valves 42', 42" open after they had been kept closed during the scavenging period, that is, while the inlet member 23 was open. By this means a certain amount of gas enters through the flap valve 42" under a certain pressure in dependence upon the adjustment of the throttle valve 21, the latter and the throttle valve 21' being always open but to different extents as the load on the engines varies, and admission of altogether pure air takes place via the back pressure flap valve 42' under the influence of throttling action of the throttle valve 21'.

The gas engine shown in Fig. 2 is modified from that shown in Fig. 1 by the separate blower 48 being driven by an electric motor 60. This blower is thus also adapted to furnish the necessary amount of air under all conditions of operation of the internal combustion engine liable to arise.

What I claim is:

1. In a supercharged internal combustion engine having a cylinder provided with an inlet port and an exhaust port, means for controlling flow through each of said ports, an exhaust conduit connected to the exhaust port of said cylinder, two charge induction conduits leading toward said inlet port, compressing means for supplying fuel and air to said charge induction conduits each separately, a scavenging air induction conduit leading to said inlet port, extra compressing means for supplying scavenging air to said scavenging air induction conduit, a scavenging air flow control member arranged in said scavenging air induction conduit, said air control member having means responsive to exhaust pressure for actuating said member to stop the flow of scavenging air when the pressure in the exhaust conduit exceeds the scavenging air pressure, means for transmitting the exhaust gas conduit pressure to said pressure responsive means, and charge flow control means in said charge induction conduits.

2. In admission control apparatus for internal combustion engines operating by means of separate ignition of precompressed charges of fuel-air mixture and with scavenging with air, an internal combustion engine having cylinders, an exhaust gas turbine driven air compressing machine for supplying solely scavenging air to said engine cylinders, a further compressing machine driven by said engine for separately supplying the fuel and the additional air to be mixed with the fuel for charging said cylinders, said cylinders having inlet members, induction conduits communicating with said inlet members in advance thereof, and with said exhaust gas turbine driven and said engine driven compressing machines, exhaust gas conduits leading out from said engine cylinders, separate scavenging air admission control members arranged in said induction conduits, exhaust gas conduction means communicating with the exhaust conduits of said cylinders and with said scavenging air admission control members for controlling the timing of the scavenging air admission control members by the momentary differential pressure between the air and gas in the inlet and exhaust conduits in accordance with the condition of operation of said engine by action of the variable exhaust gas pressure transmitted through said conduits, and means arranged in the charge induction conduit of each cylinder for preventing flow of charge to the inlet member of said cylinder during the open period of the scavenging air control member.

3. In admission control apparatus for internal combustion engines operating by means of separate ignition of precompressed charges of fuel-air mixture and with scavenging with air, an internal combustion engine having cylinders, an exhaust gas turbine driven air compressing machine for supplying solely scavenging air to said engine cylinders, a compressing machine driven by a source of power independent of said engine for separately supplying the fuel and the additional air to be mixed with the fuel for charging said cylinders, said cylinders having inlet means, induction conduits communicating with said inlet means in advance thereof and with said exhaust gas turbine driven and said independently driven compressing machines, exhaust gas conduits leading out from said engine cylinders, separate scavenging air admission control members arranged in said induction conduit of each cylinder, exhaust gas conduction means communicating with the exhaust conduits of said cylinders and with said scavenging air admission control members for controlling the timing of the scavenging air inlet means by the momentary differential pressure between the inlet and exhaust conduits in accordance with the condition of operation of said engine, by action of the variable exhaust gas pressure transmitted through said conduits, and means arranged in the induction conduits for the charge of each cylinder for preventing flow of charge to the inlet means in said cylinder during the open period of the respective scavenging air control member.

ALFRED BÜCHI.